May 25, 1943.    C. O. HANSON    2,319,986
FORK
Filed April 6, 1942
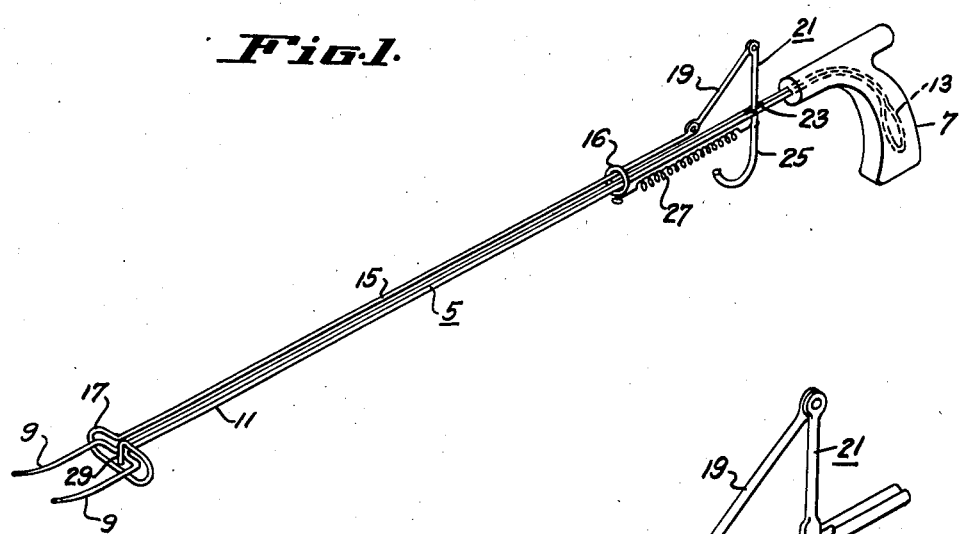
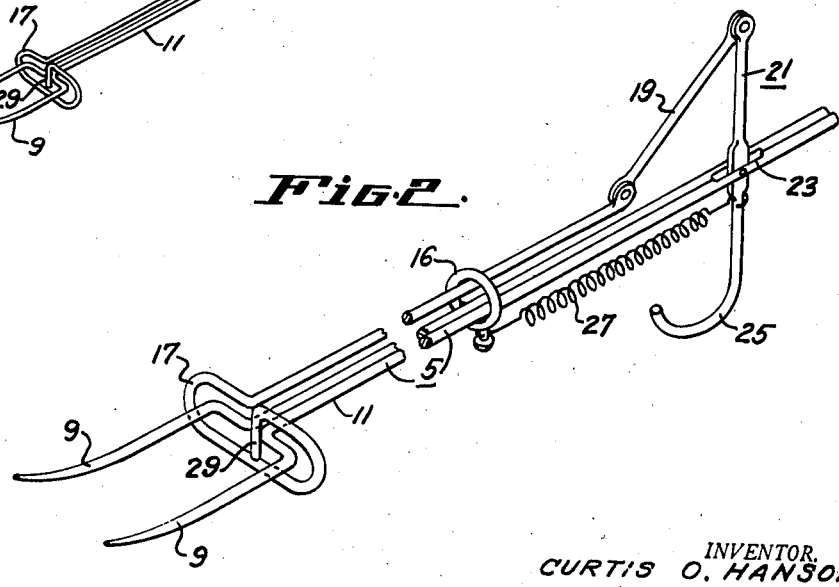
INVENTOR.
CURTIS O. HANSON
BY Charles O. Bruce
ATTORNEY.

Patented May 25, 1943

2,319,986

UNITED STATES PATENT OFFICE 2,319,986

FORK

Curtis O. Hanson, Berkeley, Calif.

Application April 6, 1942, Serial No. 437,918

5 Claims. (Cl. 294—50)

My invention relates to forks of the ejector type, and more particularly to an improved construction thereof.

Various attempts, in the past, have been made to develop a satisfactory fork of the ejector type, but in so far as I know, the constructions have either been too uneconomical for the purpose or so inconvenient or unhandy in use as to discourage use thereof by their owners.

Among the objects of my invention are to provide an improved fork of the ejector type, the construction of which has been so simplified as to bring its cost down and at the same time facilitate the operation thereof as to encourage its use. Additional objects of my invention will be brought out in the following description thereof taken in conjunction with the accompanying drawing wherein;

Figure 1 is a view, in perspective, of my improved fork; and

Figure 2 is a broken view, in perspective, showing some of the structural features on a larger scale than in Figure 1.

In the preferred form of my device, the fork comprises a shank 5, terminating at one end in a handle or grip 7, and at its other end in a pair of spaced tines 9. The shank and tines are formed of a single length of heavy wire 11 by folding the same in the middle and offsetting the adjacent free ends to form the tines. The shank is preferably spot-welded at one or two points along its length.

For reasons to be subsequently discussed, the handle or grip 7 is preferably of the pistol grip type, and is preferably molded about the handle end of the shank after the same has been curved to follow the axis of the mold, the moldable material being heat-resistant in character. The portion 13 of the shank within the handle is preferably spread somewhat to provide a more secure bond with the handle material during molding.

A rod 15 extends along the upper surface of the shank, through a guide ring 16 affixed to the shank 5 as by spot-welding, and at one end, the rod is formed into a loop 17 of a size sufficient to loosely encircle the tines 9, the other end of the rod terminating a short distance from the handle 7. This end is preferably flattened for pivot connection through a link 19 with an end of a trigger 21. The trigger is preferably pivotally supported between the halves of the shank 5 and, in doing this, the contiguous surfaces at that point are either ground flat or otherwise flattened to form a slot 23, and the trigger, if of round stock, is also flattened in the region of the pivot.

With respect to the handle or grip 7, the trigger is located so as to place the finger-engaging portion 25 within convenient reach of the finger of an operator. whereby forward travel of the loop may be effected by a rearward pull on the trigger. A limit to the forward movement of the loop 17 to a point sufficient to clear the tines of any item carried thereon, is determined by the permissible rearward travel of the finger-engaging portion 25 of the trigger 21, and this in turn is fixed by the length of the slot 23, the rear edge of which acts as a stop.

Return movement of the loop in the direction of the handle, is provided for by a coil spring 27 anchored at one end to the guide ring 16 and connected under tension to the trigger 21. The extent of such return movement, which in turn determines the normal position of the loop when the fork is not in use, is fixed by a stop on the loop, adapted to engage in the crotch formed by the tines 9. This stop may be very conveniently and economically provided for during the formation of the loop by allowing a sufficient overhang 29 and turning the same in across the loop to occupy a position between the tines when assembled on the fork. When so constructed, the stop will exert pressure against an item, intermediate the sides of the loop, and thereby facilitate its removal from the tines.

While pistol grips, as such, are now new, the application of a grip of this character in an ejector fork combination as described, provides for a firmer hold and control of the device, and permits of the normal use thereof with a minimum strain upon the wrist of the user. A straight handle, on the other hand, forces the user to hold his wrist in an unnatural and strained position which produces fatigue and is apt to discourage the use of the device.

I am familiar with certain prior attempts at providing a fork having means for ejecting items therefrom, and included among these are those disclosed in patents to Carter, 1,598,422; Hutchison, 1,857,455; and Lunz, 2,248,685. None of them, however, embodies the simplification of structure, characteristic of my improved fork, nor the advantages attributed thereto.

While I have disclosed my invention in its preferred embodiment, I do not desire to be limited in my protection to the specific details thereof, except as may be necessitated by the appended claims.

I claim:

1. An ejector fork comprising a shank terminating at one end in a handle of the pistol grip type molded thereabout, and at its other end in a pair of spaced tines, a rod extending along said shank and formed at one end into a loop about said tines, spring means between said tines and said pistol grip type handle and within finger reach from said handle, said spring means normally urging said loop in the direction of said handle, said loop having its free end turned inwardly between the tines of said fork to engage in the crotch formed at the junction of said tines with said shank and cooperate therewith to limit the movement of said loop in said direction.

2. An ejector fork comprising a shank terminating at one end in a handle and at its other end in a pair of spaced tines, a rod extending along said shank and formed at one end in a loop about said tines, a stop on said loop engaging in the crotch formed at the junction of said tines with said shank, a trigger pivotally secured to said shank adjacent the other end of said rod, a link connecting said trigger directly to said other end of the rod whereby said loop may be urged toward the ends of said tines by pressure upon the trigger, and a tension spring anchored at a point along said shank and connecting with said trigger to restore said loop to its former position with said stop engaging in said crotch, upon removal of pressure from said trigger, and an abutment on said shank disposed in the path of operation of said trigger to limit the forward movement of said loop.

3. An ejector fork comprising a shank terminating at one end in a handle and at its other end in a pair of spaced tines, a rod extending along said shank and formed at one end in a loop about said tines, a stop on said loop engaging in the crotch formed at the junction of said tines with said shank, a trigger pivotally secured to said shank adjacent the other end of said rod, a link connecting said trigger directly to said other end of the rod whereby said loop may be urged toward the ends of said tines by pressure upon the trigger, an abutment on said shank disposed in the path of movement of said trigger to limit the movement of said loop toward the ends of said tines, a ring affixed to said shank and encircling said rod to act as a guide for said rod, and a tension spring anchored to said ring and connecting with said trigger to restore said loop to its former position with said stop engaging in said crotch, upon removal of pressure from said trigger.

4. An ejector fork comprising a shank terminating at one end in a pistol grip and at its other end in a pair of spaced tines, a rod extending along said shank and formed at one end in a loop about said tines, said loop having an inturned end engaging in the crotch formed at the junction of said tines with said shank, a trigger pivotally secured to said shank adjacent the other end of said rod, a link connecting said trigger directly to said other end of the rod whereby said loop may be urged toward the ends of said tines by pressure upon the trigger, a ring affixed to said shank and encircling said rod to act as a guide for said rod, and a tension spring anchored to said ring and connecting with said trigger to restore said loop to its former position with said inturned end of said loop engaging in said crotch, upon removal of pressure from said trigger.

5. An ejector fork comprising a shank terminating at one end in a handle of the pistol grip type, and at its other end in a pair of spaced tines, a rod extending along said shank and formed at one end in a loop about said tines, said loop having an inturned end engaging in the crotch formed at the junction of said tines with said shank, a trigger pivotally secured to said shank within convenient finger reach from said pistol grip type handle, a link connecting said trigger directly to said other end of the rod whereby said loop may be urged toward the ends of said tines by pressure upon the trigger, a ring affixed to said shank and encircling said rod to act as a guide for said rod, and a tension spring anchored to said ring and connecting with said trigger to restore said loop to its former position with said inturned end of said loop engaging in said crotch, upon removal of pressure from said trigger.

CURTIS O. HANSON.